United States Patent [19]
Robert et al.

[11] Patent Number: 6,064,709
[45] Date of Patent: May 16, 2000

[54] STORAGE RACK FOR NUCLEAR FUEL ASSEMBLIES AND ITS MANUFACTURING PROCESS

[75] Inventors: Jean Robert, Sur-Erdre; Bernard Kopecky, Nantes, both of France

[73] Assignee: A.T.E.A. Societe Atlantique de Techniques Avancees, Carquefou, France

[21] Appl. No.: 09/088,474

[22] Filed: Jun. 1, 1998

[30] Foreign Application Priority Data

Jun. 5, 1997 [FR] France ................................. 97 06984

[51] Int. Cl.⁷ .................................................. G21C 19/00
[52] U.S. Cl. ........................................... 376/272; 376/261
[58] Field of Search ..................... 376/272, 261, 376/462, 442; 29/723; 211/60.1; 52/668; 250/507.1, 518.1; 220/552

[56] References Cited

U.S. PATENT DOCUMENTS

| | | | |
|---|---|---|---|
| 459,216 | 6/1986 | Feutral | 376/442 |
| 562,370 | 6/1896 | Booz | 220/552 |
| 2,496,964 | 2/1950 | Steinhauer | 220/552 |
| 2,614,715 | 10/1952 | Ross | 220/552 |
| 2,854,103 | 9/1958 | Kruger | 220/552 |
| 3,067,903 | 12/1962 | Jones, Jr. | 220/552 |
| 3,212,982 | 10/1965 | Astley et al. | 376/261 |
| 3,442,763 | 5/1969 | Chetter et al. | 376/442 |
| 3,506,540 | 4/1970 | Yevick et al. | 376/272 |
| 3,674,635 | 7/1972 | Anthony et al. | 376/442 |
| 3,715,275 | 2/1973 | Krawiec | 376/272 |
| 3,764,471 | 10/1973 | Ripley | 376/261 |
| 3,820,679 | 6/1974 | Schweitzer | 220/22.3 |
| 4,065,021 | 12/1977 | Kedzierski | 220/22 |
| 4,221,636 | 9/1980 | Feutral | 376/261 |
| 4,297,170 | 10/1981 | Leclercq | 376/442 |
| 4,457,888 | 7/1984 | Vickrey, Jr. | 376/272 |
| 4,499,997 | 2/1985 | Swingley, Jr. | 206/509 |
| 4,659,535 | 4/1987 | Couture et al. | 376/261 |
| 4,932,548 | 6/1990 | Bensinger | 220/21 |
| 5,198,127 | 3/1993 | Tilley et al. | 249/92 |
| 5,262,993 | 11/1993 | Wayne | 410/129 |
| 5,289,941 | 3/1994 | Blankenburg et al. | 220/552 |

FOREIGN PATENT DOCUMENTS

| | | | |
|---|---|---|---|
| 578502 | 1/1994 | European Pat. Off. | 376/462 |
| 594415 | 4/1994 | European Pat. Off. | 376/462 |
| 2680909 | 9/1991 | France . | |
| 2665293 | 1/1992 | France | 376/462 |
| 2668641 | 4/1992 | France | 376/462 |
| 4117622 | 12/1992 | Germany | 376/462 |
| 20710 | 5/1985 | Japan | 376/462 |
| 2157588 | 7/1987 | Japan | 376/462 |
| 1013494 | 1/1989 | Japan | 376/462 |
| 2102488 | 4/1990 | Japan | 376/462 |
| 5-80188 | of 1993 | Japan . | |
| 5-80189 | of 1993 | Japan . | |
| 405264766A | 10/1993 | Japan | 376/462 |
| 8-62379 | of 1996 | Japan . | |
| 2262833 | 6/1993 | United Kingdom | 376/462 |
| WO 92/22910 | 12/1992 | WIPO . | |
| WO 94/20964 | 9/1994 | WIPO | 376/272 |

*Primary Examiner*—Michael J. Carone
*Assistant Examiner*—Fredrick T. French, III
*Attorney, Agent, or Firm*—Pearne, Gordon, McCoy & Granger LLP

[57] ABSTRACT

A storage rack for nuclear fuel assemblies and its manufacturing process.

A storage rack for nuclear fuel assemblies is formed by assembling main plates (12), spacer plates (14), two end plates (16) and a base plate (18), preferably by welding. Once a first main plate (12(1)), a first end plate (16(1)) and the base plate (18) have been mounted on a tooling, a first series of housings (10) is formed by securing a first row of spacer plates (14(1)) to the first main plate (12(1)), and then mounting a second main plate (12(2)). The other rows of housings (10) are obtained in the same manner. The rack is completed by mounting the second end plate.

10 Claims, 4 Drawing Sheets

STORAGE RACK FOR NUCLEAR FUEL ASSEMBLIES AND ITS MANUFACTURING PROCESS

DESCRIPTION

1. Technical Field

The invention relates to a storage rack for nuclear fuel assemblies, either new or previously irradiated in a nuclear reactor.

Throughout this document, the expression "storage rack" refers to a structure of any given shape or dimensions, fixed or movable, suited to receive any given number of new or irradiated nuclear fuel assemblies.

In the nuclear industry, nuclear fuel assemblies, which are the source of energy of nuclear plants, must be stored frequently.

Such a storage relates to both new assemblies and those which have been irradiated in a nuclear reactor for a long or short time. Thus, new assemblies may be stored at their place of manufacture as well as in nuclear plants. The storage of irradiated assemblies may also take place in nuclear plant sites as well as in places removed from the latter such as reprocessing sites.

2. State of the Art

When nuclear fuel assemblies need to be stored, they are placed in storage racks submerged in pools. More specifically, a storage rack may generally receive several tens of nuclear fuel assemblies, each assembly being received in a separate vertical housing with a substantially square section. One or more racks may be placed in the same pool and the number of housings may vary depending on the dimensions of the racks, as well as the outer shapes of the latter.

The design of storage racks for nuclear fuel assemblies must account for a number of requirements, some of which are in opposition with one another. These requirements include compactness (storage of the largest possible number of assemblies in a given volume), observance of criticality requirements, ease of manufacture and cost.

Document FR-A-2 680 909 proposes a storage rack for nuclear fuel assemblies which satisfies all of these conditions. This rack is achieved by connecting tubes with a substantially square section according to a staggered arrangement by means of connection lugs welded onto the outer faces of these tubes. To satisfy the criticality requirements, particularly when the assemblies received in the rack are new or slightly irradiated, flat plates made of a neutrophagus material are installed in the free spaces separating the tubes, as and when the latter are assembled. The expression "neutrophagus material" refers to a material such as stainless boron steel, having an adsorbing power with respect to neutrons.

French patent application No. 97 01487 of Feb. 10, 1997, proposes an improvement of the storage rack described in document FR-A-2 680 909. In this case, the independent plates made of a neutrophagus material are replaced with neutrophagus assemblies having a substantially square section. Each of these assemblies consists of four flat plates made of a neutrophagus material, surrounded by at least two retaining systems. These neutrophagus assemblies may be installed at any moment following the assembly of the tubes forming the rack.

As previously mentioned, this type of storage rack satisfies the main conditions imposed on such a structure. However, the ease of manufacture of the structure is governed by the use of tubes with a substantially square section and of connection lugs welded onto these tubes. The need to resort to relatively expensive tubes tends to increase the cost of the rack. In addition, since the housings are formed in an alternate manner within a tube and between four adjacent tubes, significant dimensional and geometric differences may arise among the housings, taking into account manufacturing tolerances.

SUMMARY OF THE INVENTION

The specific object of the invention is a storage rack for nuclear fuel assemblies with an original design enabling it to satisfy all the constraints imposed on such a structure, by reducing the manufacturing cost and by improving the regularity of the dimensions and of the geometry of the housings in comparison with the rack described in document FR-A-2 680 909.

In accordance with the invention, this result is achieved by means of a storage rack for nuclear fuel assemblies, comprising a structure delimiting juxtaposed housings, with a substantially square section, according to a regularly distributed system, said structure comprising:

main plates disposed parallel to one another according to a constant spacing, spacer plates secured between adjacent main plates and parallel to one another according to said constant spacing, so as to be perpendicular to the main plates and aligned on both sides of the latter, and a base plate secured to at least some of the main plates and spacer plates, perpendicular to these plates, characterised in that teeth and protrusions formed respectively on two opposite, longest edges of the spacer plates are received in notches cut in the main plates and are provided with grooves suited to trap certain parts of the main plates located between two consecutive notches, in such a manner that the main plates and the spacer plates are secured to one another through mechanical nesting.

Two end plates are preferably secured to the main plates parallel to the spacer plates and on both sides of the latter, according to said constant spacing.

The rack structure typically forms a rectangular parallelepiped with a given height and sides. In this case, each of the main plates has the shape of a rectangle whose dimensions are the height and one of the sides of the parallelepiped, each of the spacer plates has the shape of a rectangle whose dimensions are the height and the constant spacing which separates the main plates, and the base plate has the shape of a rectangle whose dimensions are the two sides of the parallelepiped.

In the preferred embodiment of the invention, the main plates, the spacer plates, the end plates and the base plate are all substantially flat.

To satisfy the criticality constraints, in general at least two plates made of a neutrophagus material are placed in each of the housings of the structure, parallel to a main plate and to a spacer plate, in such a manner that at least one plate of neutrophagus material separates each pair of adjacent housings of the structure. The number and the distribution of the plates may vary according to the criticality constraints, the number of plates in each of the housings being less than two in certain cases.

When the rack is intended to receive new or weakly irradiated assemblies, four plates of neutrophagus material are placed in at least some of the housings.

In an advantageous manner, the four plates of neutrophagus material received in a given housing are connected together by retaining systems, so as to form removable assemblies comparable to those described in French patent application No. 97 01487 of Feb. 10, 1997.

In this last case, the main plates and the spacer plates comprise rectilinear welts, in the direction of the height of the structure, such that the sections of all the housings are substantially identical when a removable neutrophagus assembly is placed in every other housing.

Another object of the invention is a manufacturing process for such a storage rack. According to this process:

- a first main plate is disposed on a tooling,
- a first row of spacer plates is positioned and secured in turns on the first main plate,
- a second main plate is disposed parallel to the first main plate and secured to the first row of spacer plates, and
- the two prior operations are repeated so as to mount all the spacer plates and all the main plates,
- the main plates and spacer plates being secured through mechanical nesting, by trapping certain parts of the main plates, located between consecutive notches formed in the latter, in grooves provided in teeth and protrusions, formed respectively on two opposite, longest edges of the spacer plates.

BRIEF DESCRIPTION OF THE DRAWINGS

We shall now describe, as non-limiting examples, two preferred embodiments of the invention, with reference to the attached drawings, in which.

DETAILED DESCRIPTION OF THE PREFERRED EMBODIMENT

Figure 1:
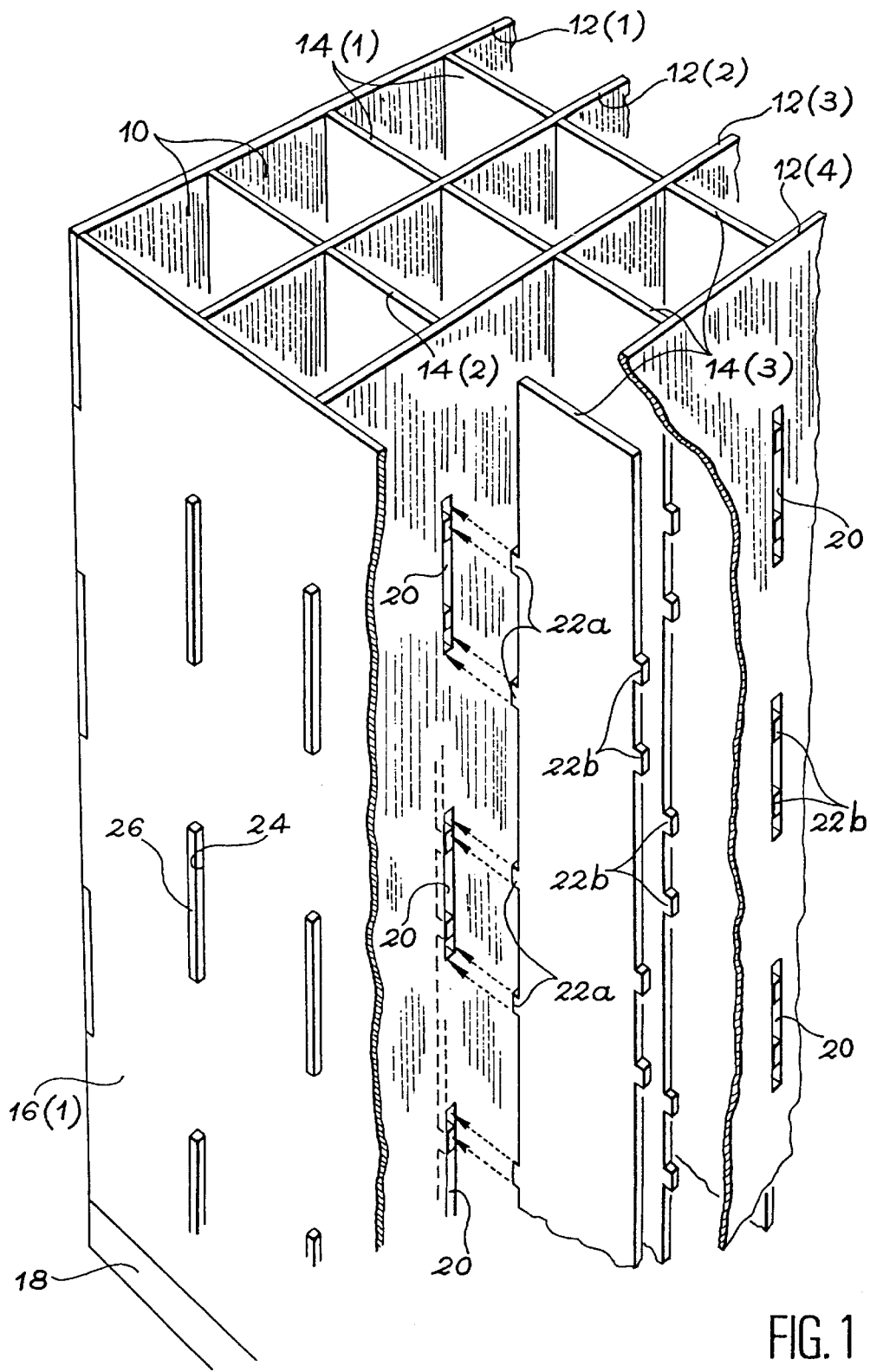
FIG. 1 is an exploded perspective view showing part of a storage rack according to a first embodiment of the invention, in the process of being assembled.

FIG. 1 is a perspective view of part of a storage rack for nuclear fuel assemblies according to a first embodiment of the invention, in the process of being manufactured.

Like all existing storage racks, the rack in accordance with the invention comprises a structure delimiting a number of juxtaposed housings 10, each of which is intended to receive a nuclear fuel assembly.

More specifically, the housings 10 are intended to be oriented substantially vertically and each of them has a substantially square section whose dimensions are slightly superior to those of the assembly which it is intended to receive. The housings are closed at their lower end and open at their upper end to enable the loading and unloading of the assemblies.

Seen from the top, the housings 10 are disposed according to a system with a square spacing, the spacing of this system being equal to the side of the square formed by the section of each of the housings.

The rack structure forms a rectangular parallelepiped whose height is adapted to that of the assemblies to be stored therein. The dimensions of the sides of this parallelepiped, along a horizontal plane, depend on the number of assemblies to be received in the rack. More specifically, to within the thickness of the plates, the dimensions of these sides are multiples of the spacing of the system formed by these housings 10.

In accordance with the invention, the rack structure comprises a number of flat main plates 12 with a rectangular shape. These main plates 12 all have identical dimensions and they are disposed parallel to one another, according to the constant spacing of the system formed by the housings 10. The sides of the rectangle formed by each of the main plates 12 are respectively equal to the height and to one of the sides of the rectangular parallelepiped formed by the rack structure.

The rack structure further comprises flat spacer plates 14 having the shape of an elongated rectangle. These spacer plates 14 are all identical. They are secured in rows between adjacent main plates 12, parallel to one another, according to a separation equal to the constant spacing which separates the main plates 12. Furthermore, the spacer plates 14 are oriented perpendicularly with respect to the main plates 12 and they are aligned on both sides of the latter, as shown in FIG. 1, to form the housings 10.

The large side of the rectangle formed by each of the spacer plates 14 is equal to the height of the rectangular parallelepiped formed by the rack structure. The small side of this rectangle is equal to the constant spacing which separates the main plates 12 and the spacer plates 14, to within the thickness of the plates.

The storage rack structure in accordance with the invention also comprises two end plates 16, only one of which is shown in FIG. 1. These end plates 16 are flat plates, having a rectangular shape and identical dimensions, whose sides correspond to the height and to the second side of the rectangular parallelepiped formed by the racks, respectively. The end plates 16 are secured to the vertical edges of the main plates 12, parallel to the spacer plates 14 and on both sides of the latter, so as to be separated by the above-mentioned constant spacing with respect to the nearest spacer plates 14.

The rack structure is completed with a base plate 18 which closes the housings 10 at their lower end. The base plate 18 is a flat plate, with a rectangular shape, whose sides correspond to the sides of the rectangular parallelepiped formed by the rack structure. The base plate 18 is secured to the lower edges of at least some of the main plates 12, spacer plates 14 and end plates 16, perpendicular to these plates.

As shown in FIG. 1, each of the main plates 12 comprises series of aligned notches 20, provided parallel to their vertical edges secured to the end plates 16 on each main plate 12. The series of notches are spaced from one another according to said constant spacing, so as to be positioned in front of each of the adjacent spacer plates 14.

The notches 20 are all identical and have the shape of an elongated rectangle, whose small side, oriented horizontally, has a dimension very slightly superior to the thickness of the spacer plates 14.

Moreover, the spacer plates 14 comprise pairs of teeth 22a and 22b, which protrude from their longest edges, oriented vertically. During assembly, each pair of teeth 22a and 22b nests into a notch 20, so as to ensure a relative positioning between the spacer plates 14 and the main plates 12, both in the vertical direction and along a horizontal direction perpendicular to the spacer plates 14.

More specifically, in each of the pairs of teeth 22a, the lower edge of the lowermost tooth is spaced from the uppermost tooth by a distance very slightly inferior to the dimension of the large side, oriented vertically, of the rectangle formed by each of the notches 20.

Moreover, in each of the pairs of teeth 22b, the lower edge of the lowermost tooth and the upper edge of the uppermost tooth are separated by a distance very slightly inferior to the spacing between the two teeth of each of the pairs of teeth 22a.

Furthermore, the notches 20 of a given series, the pairs of teeth 22a and the pairs of teeth 22b are all regularly distributed according to the same spacing.

As a result, a given notch 20 receives a pair of teeth 22a of one of the two adjacent spacer plates 14, that nest into the ends of this notch, and a pair of teeth 22b of the other adjacent spacer plate 14, that nest between the two first teeth 22a.

As also shown in FIG. 1, the end plates 16 are positioned, with respect to the main plates 12, along both a vertical direction and a horizontal direction perpendicular to the main plates. For this purpose, the vertical edges of the main plates 12 comprise tabs 26 which nest into rows of slots 24 formed in the end plates 16.

More specifically, various rows of aligned slots 24 are pierced through the end plates 16, parallel to the vertical edges of these plates, the rows of slots 24 being separated from one another according to a separation which corresponds to the above-mentioned constant spacing. The slots 24 all have the shape of an elongated rectangle whose width is very slightly superior to the thickness of the main plates 12 and whose length is very slightly inferior to the height of a tab 26, in the vertical direction.

In addition, the slots 24 of a given row and the tabs 26 are all regularly distributed according to the same spacing.

As a result, the tabs 26 nest into the slots 24 with a small play, thus ensuring the relative positioning required between the plates 12 and 16.

The arrangement described above makes it possible to manufacture the rack in a relatively simple and inexpensive manner which guarantees, with a good approximation, the sameness of the shape and dimensions of the housings 10.

First of all, a first main plate 12(1) and a first end plate 16(1) are placed, along with the base plate 18, on a tooling (not shown) in such a manner that they form three perpendicular planes serving as a reference for the rest of the assembly process. These plates 12(1) and 16(1), as well as the base plate 18, are secured to one another, preferably by welding. It must be noted that the adjoining edges of plates 12(1) and 16(1) and of plate 18 may be positioned with respect to one another by means of lugs received in recesses, as shown in FIG. 1.

In the course of a second step of the manufacturing process, a first row of spacer plates 14(1) is positioned and secured in turns on the first main plate 12(1). The positioning of each of the spacer plates 14(1) is ensured by inserting the teeth with the largest spacing in the notches 20 provided in the first main plate 12(1), so that the spacer plates are oriented in a parallel manner with respect to the end plate 16(1) and perpendicularly with respect to the main plate 12(1).

More specifically, each of the spacer plates 14(1) of the first row is positioned and secured in turns, starting with the spacer plate 14(1) nearest to the first end plate 16(1). The plates are preferably secured by welding.

A second main plate 12(2) is then disposed parallel to the first, by nesting the tabs 26 formed on the vertical edges of this second main plate into the first row of slots 24 of the end plate 16(1) and by nesting the teeth 22b formed on the vertical surface edges of the spacer plates 14(1) into the notches 20 provided in the second main plate 12(2). The second main plate 12(2) is then secured to the spacer plates 14(1) of the first row and to the first end plate 16(1), preferably by welding.

The two prior operations are repeated step by step so as to successively form as many rows of housings 10 as required. Thus, all the spacer plates 14 and all the main plates 12 are successively mounted by welding them stepwise onto the plates previously installed.

Finally, the second end plate 16 (not shown) is positioned and secured on the remaining vertical surface edges of the main plates 12. For this purpose, the tabs 26 of the main plates 12 are nested into the slots 24 provided in the second end plate 16. The plates are then secured by welding.

In the course of each of the steps described above, the lower edge of at least some of the plates installed is also welded onto the base plate 18 as and when these plates are assembled.

Figure 2:
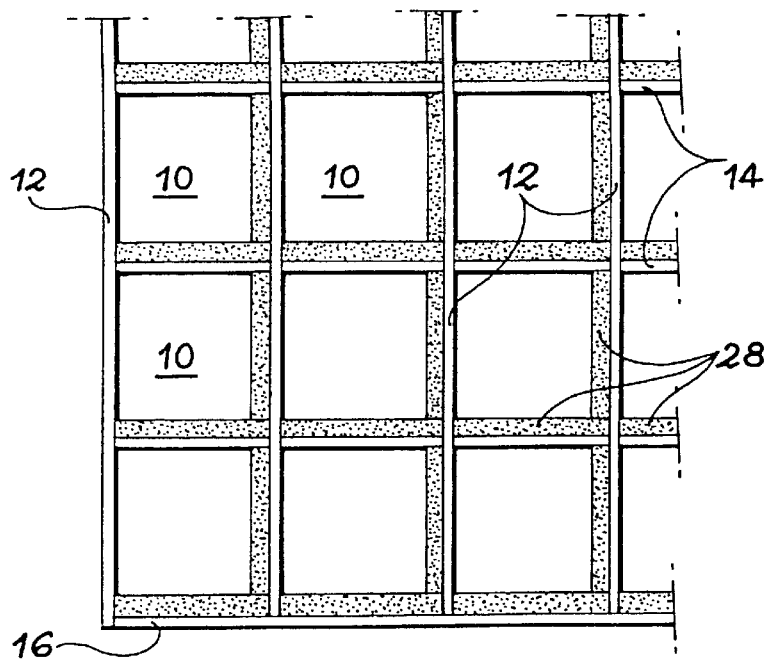
FIG. 2 is a top view schematically illustrating part of the rack of FIG. 1, in which two plates of neutrophagus material have been placed in each of the housings.

As shown schematically in FIG. 2, at least two flat plates 28 made of a neutrophagus material are generally placed in each of the housings 10 of the rack structure. More specifically, in each of the housings 10, one of the plates 28 is applied against one of the main plates 12 delimiting it and the other plate 28 is applied against one of the spacer plates 14 delimiting it. Furthermore, the arrangement of the two plates 28 in each of the housings 10 is achieved in the same manner, so that a plate 28 of neutrophagus material separates each pair of adjacent housings 10 of the structure.

The two plates 28 of neutrophagus material which are placed in each of the housings 10 preferably cooperate with each other at their adjacent ribbed edges (not shown), so as to be immobilised with respect to one another. Furthermore, the other vertical edges of the plates 28 comprise teeth (not shown) flush mounted in housings provided for this purpose in the corresponding plates of the structure. This arrangement ensures a complete immobilisation of the plates 28 in each of the housings 10.

The plates 28 of neutrophagus material are mounted along the plates 12 and 14 as and when these plates are assembled.

The arrangement described above with reference to FIG. 2 makes it possible to store spent nuclear fuel assemblies with a low reactivity.

Figure 3:
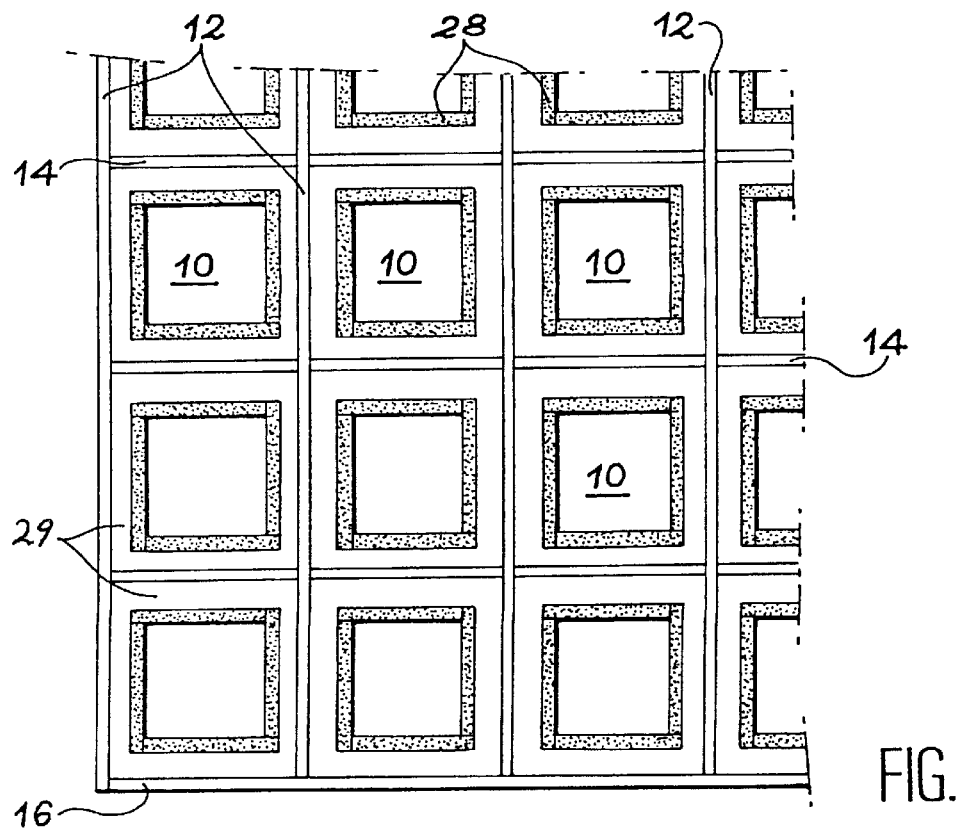
FIG. 3 is a top view comparable to FIG. 2, showing part of the rack of FIG. 1 in which removable assemblies each comprising four plates of neutrophagus material have been placed in each of the housings.

When the nuclear fuel assemblies are new or slightly spent, i.e. when they have a high reactivity, the arrangement illustrated in FIG. 3 is preferably adopted.

In this case, four plates 28 of neutrophagus material are received in each of the housings 10, near each of the main plates 12 and spacer plates 14 delimiting the housing. The four plates 28 of neutrophagus material received in each of the housings 10 are then preferably connected together by retaining systems 30 surrounding each group of four plates. More specifically, at least two retaining systems 30 surround the four plates 28 received in a given housing 10, at least two different levels.

The retaining systems 30 of the plates 28 may advantageously be achieved as described in French patent application No. 97 01487 of Feb. 10, 1997. Thus, these retaining systems 30 may include rigid frames forming a square as seen from the top and surrounding the groups of four plates 28 so as to keep them in position as illustrated in FIG. 3. The rigid frames 30 may, for example, be immobilised on the plates 28, along a vertical direction, by notches (not shown) provided in these plates.

In the embodiment of FIG. 3, the presence of the retaining systems 30 between the plates 28 of neutrophagus material and the plates 12 and 14 makes it possible to guarantee the presence of a water streak between adjacent assemblies.

The plates 28 of neutrophagus material may also be kept in position in another manner: added shims, welts on the main plates and spacer plates, local deformations of these plates, etc.

The neutrophagus assemblies made up of the flat plates 28 and their associated retaining systems are generally installed in the housings 10 following the assembly of the structure made up of the main plates 12, the spacer plates 14, the end plates 16 and the base plate 18. They may also be mounted as and when the rack is assembled.

It must be noted that it is possible to only mount a neutrophagus assembly in every other housing 10, when the assemblies to be stored have a low reactivity.

Moreover, instead of receiving two teeth 22a, 22b of each of the spacer plates 14, a given notch 20 may receive only one tooth of each of the plates 14, with these teeth placed one on top of the another in the notch. Finally, the teeth formed on the spacer plates disposed on both sides of a given main plate 12 may be received in different notches, with each notch receiving a single tooth.

In a second embodiment of the invention, which shall now be described with reference to FIGS. 4 and 5, the links between the main plates 12 and the spacer plates 14 are achieved without welding, through mechanical nesting.

In this second embodiment, the rack is formed, as previously described, by assembling main plates 12, spacer plates 14, housing roots (not shown). In addition, removable neutrophagus assemblies similar to those previously described and each comprising four plates 28 of neutrophagus material (FIG. 5) are placed in every other housing 10, according to a staggered arrangement.

In this case, the main plates 12 and the spacer plates 14 comprise series of rectilinear welts 13 and 15, parallel to their large sides, so as to be oriented in the direction of the height when the rack is completed. These welts 13 and 15 are achieved in such a manner that the sections of all the housings 10 are substantially identical, after a neutrophagus assembly has been placed in every other housing.

To enable the assembly of the plates 12 and 14, series of aligned notches are cut in the main plates 12, parallel to their large sides, observing a separation equal to the spacing of the housings 10. Each series of notches is made up of three types of notches 20a, 20b and 20c.

The notches 20a are rectangular notches spaced at regular intervals. Some of these notches 20a, indicated by reference 20b (one out of two in the example illustrated in FIG. 4), have a short length. The notches 20c are identical rectangular notches, located above the notches 20b.

Moreover, each of the large sides of the spacer plates 14 is ribbed according to a conjugate or complementary profile, such that the opposite edges of two spacer plates 14 placed on both sides of a main plate 12 nest precisely into each another, via the notches 20a, 20b and 20c of a given row.

More specifically, one of the large sides of each spacer plate 14 comprises rectangular teeth 22a spaced at regular intervals, whereas the other large side comprises rectangular nicks 22b located at the same level and whose dimensions are identical. The teeth 22a are placed so as to coincide with the notches 20a and 20b cut in the main plates 12.

Figure 4:
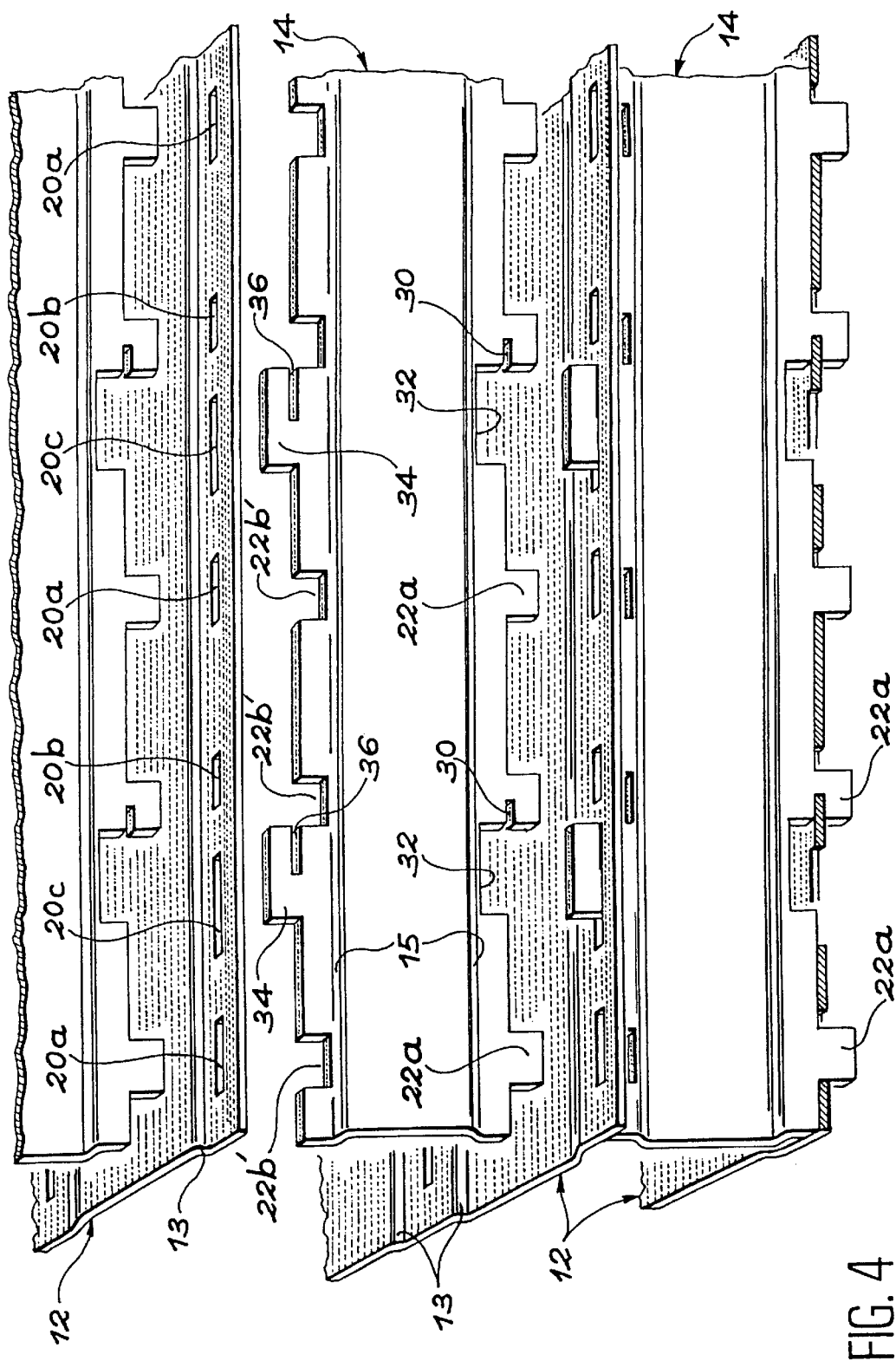
FIG. 4 is a perspective view showing part of a storage rack according to a second embodiment of the invention, in the process of being assembled.

Some of the teeth 22a (for example, one out of two, as illustrated in FIG. 4) have a groove 30, facing upwards for example, along the corresponding large side of the spacer plate 14. The teeth 22a comprising a groove 30 are located in front of the notches 20b and the teeth 22a without grooves are located in front of the notches 20a. The length of each of the notches 20a is equal to the height of a tooth 22a (measured parallel to the large sides of the spacer plate), plus the length of the groove 30, and the length of each of the notches 20b is equal to the height of a tooth 22a.

Above each of the teeth 22a comprising a groove 30, a rectangular notch 32 is cut in the corresponding large side of the spacer plate 14. The other large side of this plate 14 comprises, at the same level as each of the notches 32, a rectangular protrusion 34 having the same dimensions as the notch. The height of each of these protrusions 34 and notches 32 (measured parallel to the large sides of the spacer plate 14) is equal to the length of each of the notches 20c, and their spacing is the same.

A second groove 36, in this case facing downwards, is machined in each protrusion 34, along the corresponding large side of the spacer plate 14. The length of each of the grooves 36 is substantially twice that of the grooves 30.

Thus, when the opposite edges of two spacer plates are nested into each other, the grooves 30 and 36 are grouped two by two as a prolongation of one another, to behave liked closed, aligned notches in which certain parts of the main plates 12 located between two consecutive notches 20b and 20c are trapped.

The assembly of the plates 12 and 14 shall now be described with reference to FIG. 4.

A first main plate 12 is set on a horizontal support tooling (not shown).

A first row of spacer plates 14 is then installed, by engaging the teeth 22a in the notches 20a and 20b. The parallel alignment of the plates 14 is ensured by an appropriate tooling (not shown). The teeth 22a without grooves are then at the bottom of the notches 20a and the teeth 22a provided with grooves 30 are the same level as the notches 20b. Locking is ensured by displacing the plates 14 towards the left in FIG. 4.

A second main plate 12 is then placed on the first row of spacer plates 14, by engaging the protrusions 34 in the notches 20c. The second main plate 12 is then displaced towards the left in FIG. 4, so as to bring the root of the grooves 36 into abutment against the right edge of the notches 20c. The right edge of the protrusions 34 is then flush with the left edge of the notches 20b.

A second row of spacer plates 14 is then installed, as previously described. Each of these plates 14 is then displaced towards the left in FIG. 4, so as to bring the root of the grooves 30 into abutment against the left edge of the notches 20b. In the course of this movement, the second main plate 12 is also pushed towards the right through half of the length of the grooves 36. At the end of the movement, the main plate 12 is therefore simultaneously engaged with the grooves 30 and 36, and the two rows of spacer plates are locked together.

In the housings not intended to receive neutrophagus assemblies, bottoms (not shown) are mounted which snap into the four plates defining the housing and ensure the locking of the row of plates in question.

The prior operations are repeated as many times as necessary, until the required size for the rack has been obtained.

Finally, the base plate (not shown) is bolted onto the bottoms, so as to complete the assembly.

Figure 5:
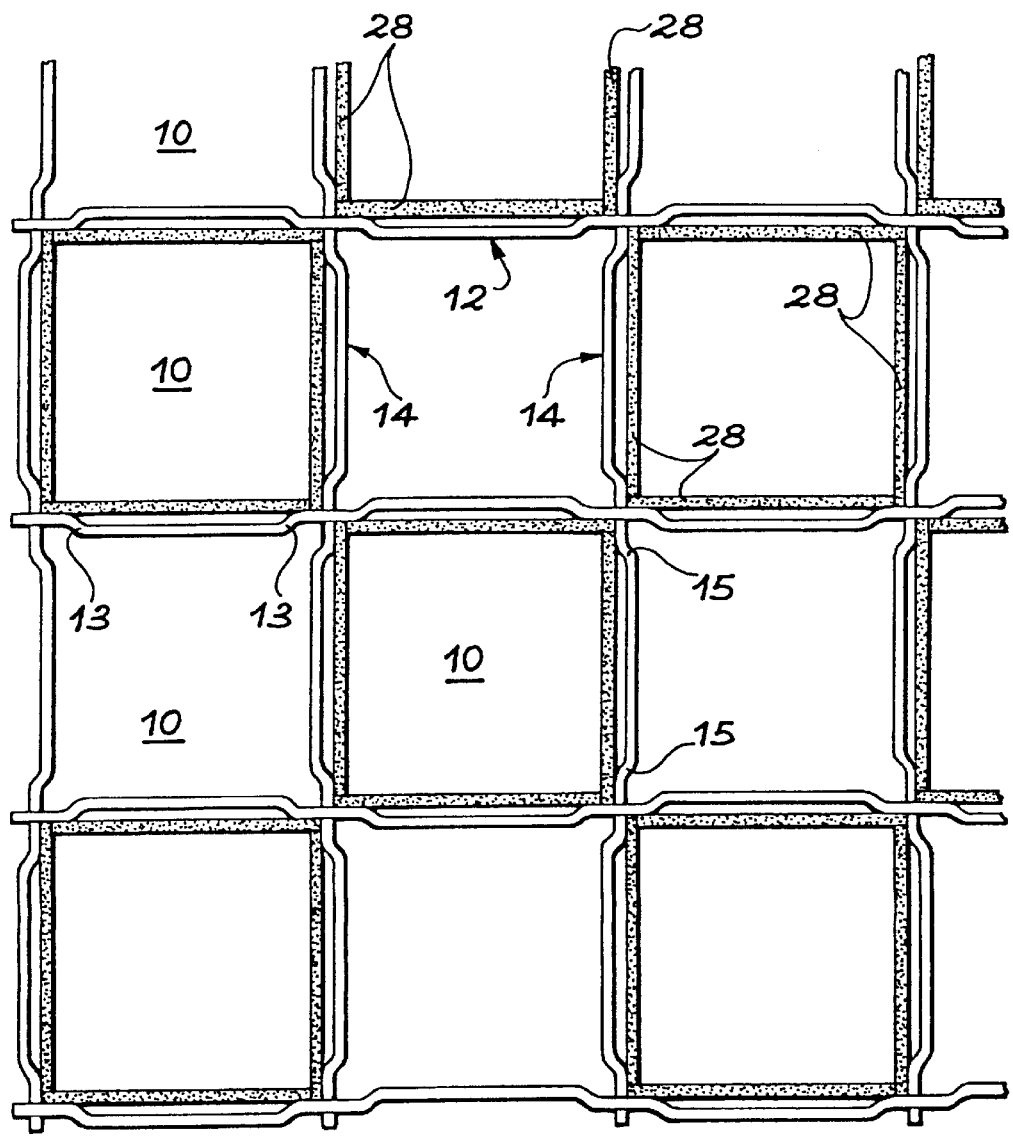
FIG. 5 is a top view of the rack of FIG. 4 in which plates of neutrophagus material have been placed in every other housing.

The neutrophagus assemblies can then be installed, as illustrated in FIG. 5.

We claim:

1. A storage rack for nuclear fuel assemblies, comprising a structure delimiting juxtaposed housings, with a substantially square section, according to a regularly distributed system, said structure comprising:

main plates disposed parallel to one another according to a constant spacing, spacer plates secured between adjacent main plates and parallel to one another according to said constant spacing, so as to be perpendicular to the main plates and aligned on both sides of the latter, and a base plate secured to at least some of the main plates and spacer plates, perpendicular to these plates, wherein teeth and protrusions formed respectively on two opposite, longest edges of the spacer plates are received in notches cut in the main plates and are provided with grooves suited to trap certain parts of the main plates located between two consecutive notches, in such a manner that the main plates and the spacer plates are secured to one another through mechanical nesting.

2. A rack according to claim 1, wherein at least two plates made of a neutrophagus material are placed in each of the housings of the structure, parallel to a main plate and to a spacer plate, in such a manner that at least one plate of neutrophagus material separates each pair of adjacent housings of the structure.

3. A rack according to claim 2, wherein four plates of neutrophagus material are placed in at least some of the housings.

4. A rack according to claim 3, wherein the four plates of neutrophagus material received in a given housing are connected together by retaining systems, so as to form removable neutrophagus assemblies.

5. A rack according to claim 4, wherein the main plates and the spacer plates comprise rectilinear welts, in the direction of the height of the structure, such that the sections of all the housings are substantially identical when a removable neutrophagus assembly is placed in every other housing.

6. A rack according to claim 1, wherein at least two plates of neutrophagus material are placed in each of the housings.

7. A rack according to claim 1, wherein the structure further comprises two end plates secured to the main plates parallel to the spacer plates and on both sides of the latter, according to said constant spacing.

8. A rack according to claim 7, wherein the main plates have opposite edges, parallel to the spacer plates, said opposite edges being provided with tabs received in slots cut in the end plates.

9. A rack according to claim 7, wherein the main plates, the spacer plates, the end plates and the base plate are substantially flat.

10. A rack according to claim 1, wherein the structure forms a rectangular parallelepiped with a given height and sides, each of the main plates has the shape of a rectangle whose dimensions are the height and one of the sides of the parallelepiped, each of the spacer plates has the shape of a rectangle whose dimensions are the height and said spacing, and the base plate has the shape of a rectangle whose dimensions are said sides.

* * * * *

UNITED STATES PATENT AND TRADEMARK OFFICE
CERTIFICATE OF CORRECTION

PATENT NO.    : 6,064,709
DATED         : May 16, 2000
INVENTOR(S)   : Robert et al.

It is certified that error appears in the above-identified patent and that said Letters Patent is hereby corrected as shown below:

Title Page,
Section [56], References Cited, U.S. PATENT DOCUMENTS, delete "459,216" and insert -- 4,594,216 --.
Section [56], References Cited, U.S. PATENT DOCUMENTS, delete "5,262,993" and insert -- 5,265,993 --.

Column 3,
Line 61, after "housings" insert -- 10 --.

Column 4,
Line 54, after "notches" inser-t -- 20 --.

Column 6,
Line 60, after "housing 10," insert -- at--

Signed and Sealed this

Thirty-first Day of July, 2001

Attest:

NICHOLAS P. GODICI
Attesting Officer    Acting Director of the United States Patent and Trademark Office